United States Patent
Wang et al.

(10) Patent No.: US 11,543,112 B1
(45) Date of Patent: Jan. 3, 2023

(54) HUMAN-FACTOR LAMP CAPABLE OF INTELLIGENTLY ADJUSTING AMBIENT LIGHT AND SYSTEM THEREOF

(71) Applicants: GENERAL LUMINAIRE CO., LTD., New Taipei (TW); GENERAL LUMINAIRE (SHANGHAI) CO., LTD., Shanghai (CN); GENERAL LUMINAIRE (KUNSHAN) CO., LTD., Kunshan (CN)

(72) Inventors: Yung-Hong Wang, Shanghai (CN); Chien Lee, Shanghai (CN); Brian A Cook, Shanghai (CN)

(*) Notice: Subject to any disclaimer, the term of this patent is extended or adjusted under 35 U.S.C. 154(b) by 0 days.

(21) Appl. No.: 17/471,188

(22) Filed: Sep. 10, 2021

(51) Int. Cl.
*F21V 23/04* (2006.01)
*F21V 23/00* (2015.01)
*H05B 45/10* (2020.01)
*H05B 47/115* (2020.01)

(52) U.S. Cl.
CPC ........ *F21V 23/0471* (2013.01); *F21V 23/003* (2013.01); *H05B 45/10* (2020.01); *H05B 47/115* (2020.01)

(58) Field of Classification Search
CPC . F21V 23/003; F21V 23/0471; H05B 47/115; H05B 45/10
See application file for complete search history.

(56) References Cited

U.S. PATENT DOCUMENTS 8,872,432 B2 * 10/2014 Kercso ................. H05B 47/115
                                                                    315/307
9,807,857 B2 * 10/2017 Huang ................... H05B 47/19

FOREIGN PATENT DOCUMENTS

WO   WO-2010079388 A1 *  7/2010  ......... H05B 37/0227

* cited by examiner

*Primary Examiner* — Alexander H Taningco
*Assistant Examiner* — Pedro C Fernandez (57) ABSTRACT

A human-factor lamp and system capable of intelligently adjusting ambient light includes light emitting devices, each having a detection unit. When the detection unit detects a human within the lamps sensor field of view one of the light emitting device, such light emitting device is defined as a primary lamp and all others are defined as secondary lamps. The primary lamp is adjusted to a maximum luminous intensity and the secondary lamps are adjusted outwardly from the primary lamp and decremented to a minimum luminous intensity. When any secondary lamp is near more primary lamps away from different distances, the one with a larger luminous intensity is used as a basis for adjusting the brightness after the luminous intensity of the secondary lamp is decremented. In the environment having the human-factor lighting system, the overall ambient luminous performance can be changed according to the moving position of people.

15 Claims, 9 Drawing Sheets

HUMAN-FACTOR LAMP CAPABLE OF INTELLIGENTLY ADJUSTING AMBIENT LIGHT AND SYSTEM THEREOF

BACKGROUND

Technical Field

The present disclosure relates to the technical field of lighting adjustment. More particularly, the present disclosure relates to a human-factor lamp and system capable of intelligently adjusting ambient light, which detects the moving position of a person and further adjusts the ambient light to improve the overall lighting effect.

Description of Related Art

The main purpose of lighting design is to provide appropriate light in a space for users to engage in various visual activities, so that the lighting design of these activities needs to be adjusted according to the activities.

For large indoor environments such as factories or warehouses, common systems are equipped with a large number of lamps with a consistent lighting condition. Due to special purposes, some large indoor environments even require 24 hours of uninterrupted lighting. However, the traditional lamps are unable to achieve the effect of human factors in lighting. In other words, the traditional lamps cannot adjust the lighting effectively when there are no people around, thus resulting in unnecessary energy consumption.

In some conventional technologies, sensors are provided to sense the entry and exit of people, wherein the lamps are usually turned off, and they are turned on only when there are people around. In addition, the lamps will be turned off automatically after being turned on for a certain period of time, and thus can achieve the effect of energy saving. On the other hand, there is another technical method capable of automatically turning on the lighting equipment when the brightness of ambient light is insufficient.

However, these conventional technologies just provide the method of turning on the lighting equipment after a sensing condition is triggered, and the ON and OFF adjustments of the lamps can be made independently or a central control system is required for consistent modulation. So far, there is no lighting device capable of synchronously adjusting all lamps according to the movement of people in the whole environment, producing a differential lighting effect for each lamp, and overcoming the aforementioned drawbacks of the prior art including the additional network setup cost, unnecessary energy consumption and difficult control of the conventional lamps that use the central control system. As disclosed in U.S. Pat. No. 9,807,857B2 entitled "ILLUMINATION CONTROL SYSTEM", a mobile device is used as a positioning tool and linked with a lamp, and a positioning system is provided for detecting the position of a person and driving the operation of a lamp near such position. In addition, U.S. Pat. No. 8,872,432 B2 entitled "SOLUTION FOR DYNAMIC LIGHTING CONTROL" provides a plurality of sensors with different detection ranges on an independent lamp for sensing the distance from the position of a person in order to adjust the luminous intensity. In other words, these technologies just provide a technical measure for sensing and controlling independent lamps only, but there is no technical measure for the mutual communication between the lamps, so that after the lamps communicate with each other, all of the lamps are adjusted fixedly by a linkage operation for the lighting effect.

In view of the aforementioned drawbacks, the discloser of this disclosure based on years of experience in the related industry to conduct extensive research and development and finally provided a human-factor lamp capable of communicating with another human-factor lamp according to the movement of people, and using a differential lighting intensity for the overall adjustment, and this disclosure is totally different from the conventional practices and can overcome the aforementioned drawbacks of the prior art and provide a better perception of lighting for human eyes, while achieving the effect of human factors in lighting, including the good perception, energy-saving, easy-to-install, and low overall control cost effects.

SUMMARY

Therefore, it is a primary objective of the present disclosure to provide a human-factor lamp capable of adapting different environments, greatly lowering the setup cost, and facilitating installation. Unlike the traditional lighting system that cannot adjust the overall lighting performance flexibly, the human-factor lamp does not adopt the conventional modulation method or use a central control system. On the other hand, the human-factor lamp automatically makes adjustments through the detection of people and takes advantage of the human eye's perception of light, such as brightness consistency etc. to design a lamp that can adjust the overall ambient lighting according the moving position of people and does not cause visual conflict or discomfort to human eyes after the light adjustment. Especially for places where lighting must be maintained for 24 hours a day, the lighting system can further achieve the energy-saving effect for the overall environment and eliminate psychological pressure or panic caused the visual perception of the too-dark areas.

To achieve the foregoing and other objectives, the present disclosure discloses a human-factor lamp capable of intelligently adjusting ambient light, and the human-factor lamp includes a plurality of light emitting devices, characterized in that each of the light emitting devices comprises a control processor, and a dimming unit, an identification unit, a detection unit, a transmitting unit, a receiving unit which are electrically connected to the control processor, wherein the identification unit stores an identity code and a relationship form, and the identity code serves a number identification of the light emitting device, and the relationship form stores all identity codes of the light emitting devices and pre-sets a hierarchical relationship between each of the light emitting devices and the lighting emitting devices other than itself; if the detection unit of one of the light emitting devices detects that there is a person within the lamps sensor field of view (FOV), the detection unit will notice the control processor to drive the dimming unit to set a priority luminous value, and the detection unit will notice the control processor to drive the transmitting unit to carry out a light emission broadcast to the light emitting devices with the identity code other than the identity code of the lighting emitting device detected that there is a person within the lamps sensor field of view (FOV) listed in the relationship form; if the detection unit of one of the light emitting devices detects that there is no person within the lamps sensor field of view (FOV), the receiving unit will receive at least one of the light emission broadcasts of the light emitting devices with the identity code other than the identity code of the light emitting device detected that there is no person within the lamps sensor field of view (FOV), and the receiving unit will notice the control processor to drive the dimming unit to set a secondary luminous value according to the light emission broadcast; wherein the secondary luminous value setting parameter is set according to the determination by the hierarchical relationship in the relationship form, and if the receiving unit simultaneously receives two or more light emission broadcasts, the secondary luminous value setting parameter will be set for the secondary luminous value according to the highest priority of the hierarchical relationship in the relationship form.

Therefore, each of the light emitting devices detects whether there are people around to determine the setting of a priority luminous value; if it is detected that there are no people around, then each lighting emitting device will further determine the setting of a secondary luminous value and observe all other light emitting devices. Since this technical measure does not include any central control system, each light emitting device uses a pre-set interactive relationship of the light emitting device with other light emitting devices to further automatically adjust the lighting setup conditions after observing the position and moving situation of people. Therefore, this disclosure features a low overall setup cost and a convenient installation and light adjustment, and the human factor lamp can meet the effective application requirement of an environment and save unnecessary energy consumption.

In an embodiment, this disclosure does not adjust all of the light emitting devices by means of a central control adjustment, but it takes advantage of the pre-set relationship between the light emitting devices and uses the detection of people as the priority trigger mechanism. When no people around are detected, the human-factor lamp further determines the lighting condition of one of the light emitting devices according to the pre-set relationship between the light emitting device with people and itself. The so-called pre-set relationship is in various indoor environments. Wherein, the hierarchical relationship of the relationship form is preferably set according to the installation distance. Therefore, based on the effective irradiation range of the light, the overall distribution of light can be set according to the appropriate spacing distance.

In the previous embodiments, the lighting setup conditions for all light emitting devices can be divided into a plurality of lighting conditions according to the installation distance relationship. Wherein, the hierarchical relationship of the relationship form preferably has a first close relationship, a second close relationship, and a third close relationship. Therefore, this embodiment uses the aforementioned four lighting mode to form the indoor ambient light of an environment when the light emitting devices are installed in the environment.

In the previous embodiments, the decrementing relationship between light intensity and distance, and the perceptive feature of brightness consistency are taken into account. Preferably, when at least one the light emitting device is set to the priority luminous value, the lighting is driven by 100% of the rated luminous intensity of the light emitting device; when at least one other light emitting device is set to a first close relationship by the secondary luminous value, the lighting is driven by 75% of the rated luminous intensity of the light emitting device; when at least one other light emitting device is set to a second close relationship by the secondary luminous value, the lighting is driven by 50% of the rated luminous intensity of the light emitting device; when at least one other light emitting device is set to a third close relationship by the secondary luminous value, the lighting is driven by 25% of the rated luminous intensity of the light emitting device. Alternatively, when at least one of the light emitting devices is set to a priority luminous value, the lighting is driven by 100% of the rated luminous intensity of the light emitting device; when at least one other light emitting device is set to a first close relationship by the secondary luminous value, the lighting is driven by 75% of the rated luminous intensity of the light emitting device; when at least one other light emitting device is set to a second close relationship by the secondary luminous value, the lighting is driven by 50% of the rated luminous intensity of the light emitting device; when at least one other light emitting device is set to a second close relationship by the third close relationship, the lighting is driven by 20% of the rated luminous intensity of the light emitting device. In this way, the best lighting performance can be presented in the position of people, the discomfort and psychological pressure of the too-dark area will not be produced for the environment at a distance.

In all previous embodiments, the identity code of each corresponding light emitting device uses an X-Y two-dimensional coordinate value as a number identification in order to facilitate listing all light emitting devices in the relationship form. In this way, when the hierarchical relationship of the relationship form is set based on the installation distance, the X-Y two-dimensional coordinate value can intuitively reflect the distance relationship between two adjacent light emitting devices.

In the previous embodiments, the detection unit is an infrared thermal sensor or a microwave sensor. These two types of sensors can accurately detect the position of people and adjust the overall luminous performance accordingly.

To achieve the foregoing and other objectives, the present disclosure also discloses a human-factors lighting system capable of intelligently adjusting ambient light, and the system includes a plurality of light emitting devices and is installed in a factory, characterized in that each of the light emitting devices has a detection unit, and when one of the light emitting devices detects that there is a human body situated within the lamps sensor field of view (FOV) by the detection unit, the light emitting device is defined as a primary lamp and all of the other light emitting devices are defined as secondary lamps, wherein the primary lamp is adjusted to a maximum luminous intensity, and the light emitting devices of the other second lamps are adjusted sequentially from the position of the primary lamp position to the outside with a stepwise decremented luminous intensity to a minimum luminous intensity; and if any one of the secondary lamps is near two or more primary lamps of different distances, a larger luminous intensity is used as the basis for adjusting brightness after the secondary lamp is adjusted with the stepwise decremented luminous intensities. In this disclosure, the overall installation construction and the light adjustment are more convenient, and the features of human factors in lighting can meet the effective application requirement of an environment and save unnecessary energy consumption.

Preferably, the primary lamp and the secondary lamp adjusted with the stepwise decremented luminous intensities have an intensity ratio of 100%:75%:50%:25%; or 100%:70%:50%:20%. Alternatively, based on user requirements and site conditions such as the quantity and size of equipment, the wall reflection conditions, and related factors, an appropriate adjustment can be made according to the following suggestions if the adjustment has a tendency of decreasing the brightness with increased distance (i.e. the primary lamp and the secondary lamps have a stepwise luminous intensity decrement value decremented in an equal intensity difference or proportional reduction mode). In this way, the best lighting performance can be presented in the position of people, the discomfort and psychological pressure of the too-dark area will not be produced for the environment at a distance.

In summation of the description above, the human-factor lamp of this disclosure can significantly lower the setup cost and facilitate installation, and the lighting does not cause visual conflict or discomfort to the human eye after light adjustment, especially for places where lighting must be maintained for 24 hours a day, and the lighting system can further achieve the energy-saving effect for the overall environment and eliminate psychological pressure or panic caused the visual perception of the too-dark areas.

DESCRIPTION OF THE EMBODIMENTS

This disclosure will now be described in more detail hereinafter with reference to the accompanying drawings that show various embodiments of the invention.

Figure 1:
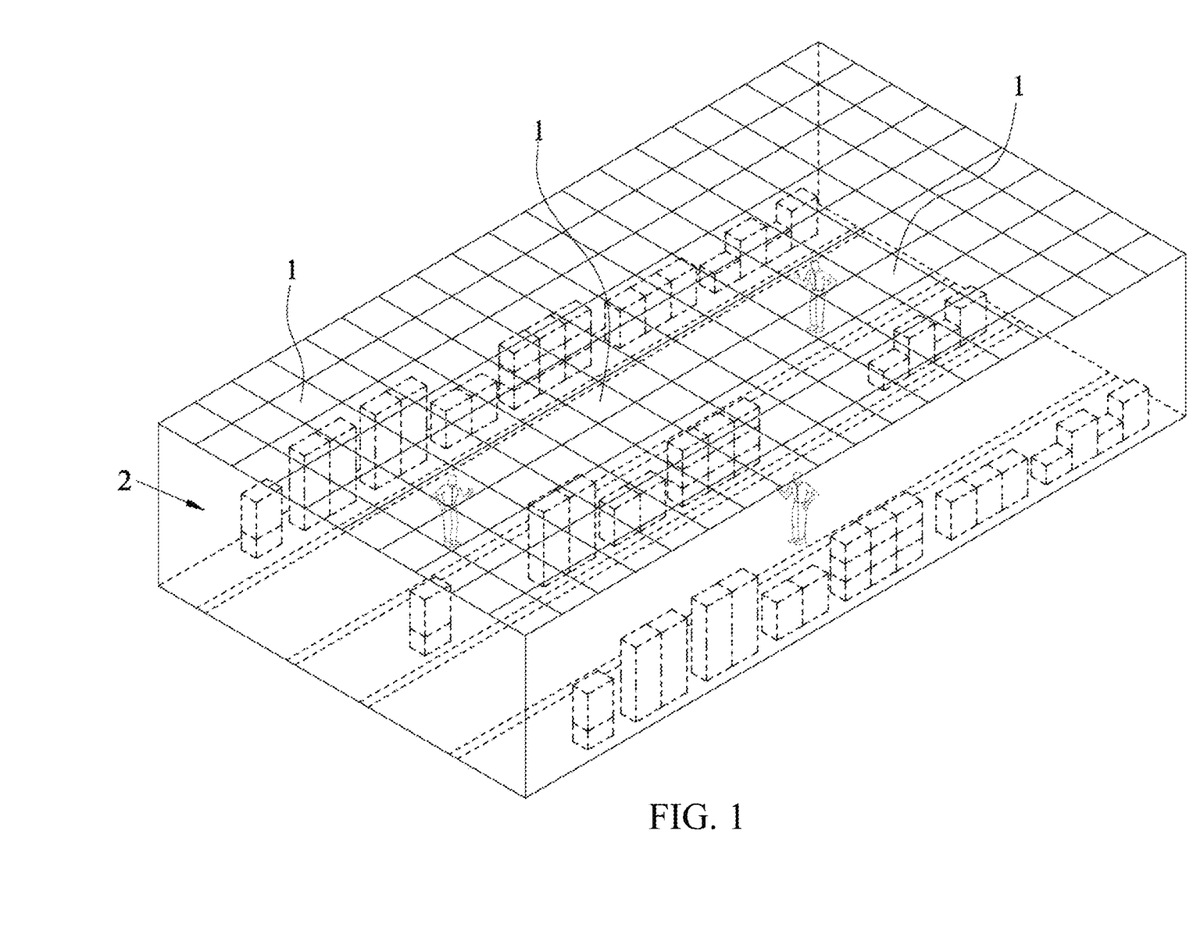
FIG. 1 is a schematic view of a human-factors lighting system installed in a factory environment in accordance with a preferred embodiment of this disclosure.
Figure 2:
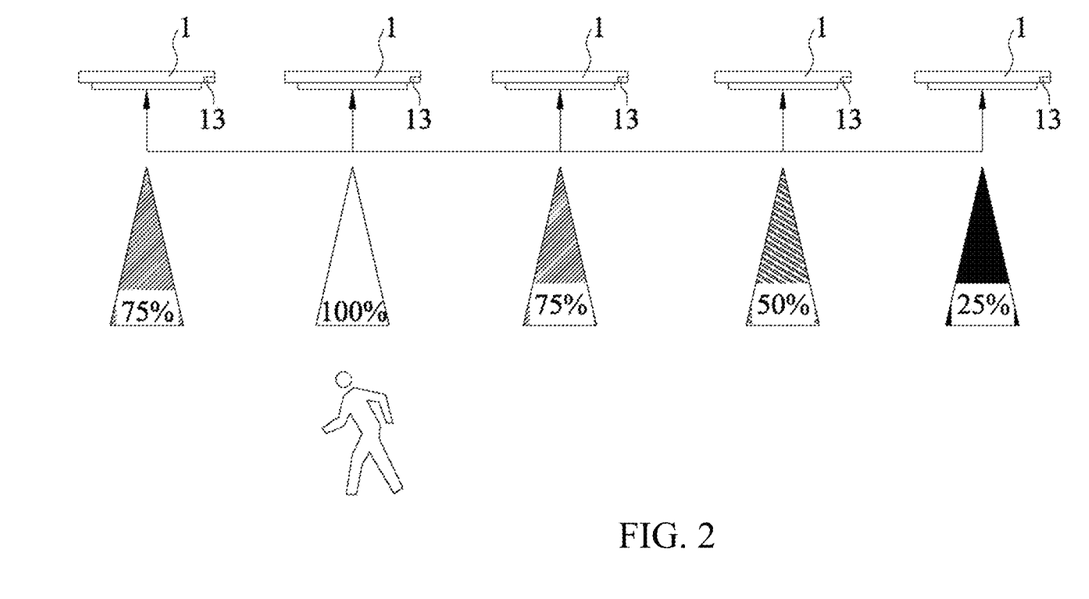
FIG. 2 is a first schematic view of modulating the lighting intensity of a human-factors lighting system in accordance with a preferred embodiment of this disclosure.
Figure 3:
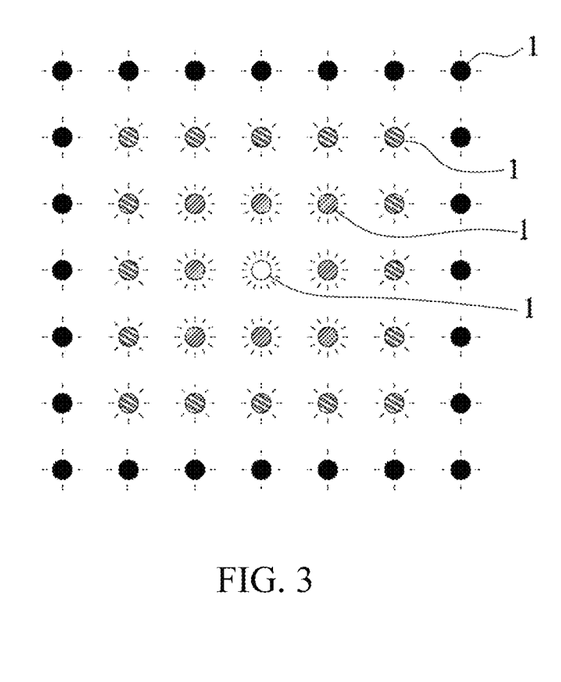
FIG. 3 is a second schematic view of modulating the lighting intensity of a human-factors lighting system in accordance with a preferred embodiment of this disclosure.

With reference to FIGS. 1, 2 and 3 for the schematic view of a human-factors lighting system installed in a factory environment and the first and second schematic views of modulating the lighting intensity of the human-factors lighting system in accordance with a preferred embodiment of this disclosure respectively, the human-factors lighting system includes a plurality of light emitting devices 1 sequentially installed and uniformly distributed on a ceiling of a factory 2. The factory 2 can accommodate workers and allow them to move or perform operations in the factory 2. For example, a large warehouse environment is an appropriate example. Since various types of the factory 2 usually have an environment with a large area, the traditional lighting mode is mostly set to turn on all lamps with a fixed brightness in the factory in order to avoid the burden and danger of work caused by the too-dark areas. However, this will cause unnecessary energy consumption, especially for the requirement of maintaining an uninterrupted lighting environment throughout the year, which creates a great burden on the energy supply. Therefore, this disclosure overcomes the drawbacks of the prior art by providing a human-factors lighting system having the light emitting devices 1 in accordance with this preferred embodiment to detect the position of workers and further adjust the overall brightness performance of the light emitting devices 1. Each of the light emitting devices 1 has a detection unit 13, and when the detection unit 13 of a light emitting device 1 detects that there is a person within the lamps sensor field of view (FOV), the light emitting device 1 is defined as a primary lamp, and all other light emitting devices 1 are defined as secondary lamps, wherein one or more light emitting devices 1 defined as the primary lamp are adjusted to a maximum luminous intensity, and the light emitting devices 1 of the other secondary lamp are adjusted sequentially from the position of the primary lamp position to the outside with a stepwise decremented luminous intensity to a minimum luminous intensity. While adjusting brightness, it is inevitable to have people around. As a result, when any one secondary lamp at this time is near two or more primary lamps of different distances, the secondary lamps are adjusted with the stepwise decremented luminous intensity and then a larger luminous intensity is preferably used as the basis for adjusting brightness. Preferably, the intensity ratio of the primary lamp to the secondary lamps adjusted with the stepwise decremented luminous intensity is designed with a multi-stage design according to the size of the factory environment and the distance between the ceiling and people. For example, this embodiment adopts the common intensity ratios such as 100%: 75%: 50%: 25% and 100%: 70%: 50%: 20% for four different intensities. In this way, this disclosure can effectively reduce unnecessary energy consumption while taking the public safety of the environment into account, so that the best lighting performance can be presented in the position of people, the discomfort and psychological pressure of the too-dark area will not be produced for the environment at a distance. Of course, based on user requirements and site conditions such as the quantity and size of equipment, the wall reflection conditions, and related factors, an appropriate adjustment can be made according to the following suggestions if the adjustment has a tendency of decreasing the brightness with increased distance. For example, the brightness of the light emitting device is decremented sequentially outward from the strongest 100% with equal intensity difference or equal proportion.

In another preferred embodiment, the human-factor lamp of this disclosure is further elaborated. In FIGS. 1, 2, 3 and 4, FIG. 4 shows a functional block diagram of a human-factor lamp capable of intelligently adjusting ambient light in accordance with a preferred embodiment of this disclosure, and the human-factor lamp has a plurality of light emitting devices 1. Unlike the conventional central control method, the human-factor lamp of this disclosure provides the functions of "eye", "ear", "mouth" and "brain" to each light emitting devices 1, and the light emitting devices 1 observes whether or not there are people within the lamps sensor field of view (FOV) through the "eye", and when there are people around, the "mouth" will broadcast the observation to the other light emitting devices 1; and when there are no people around, the "ear" will hear the broadcast from other light emitting devices 1 telling the information that there are people around such light emitting device 1, and finally each of the light emitting devices 1 uses its "brain" to determine its own luminous intensity performance based on the observation result of having people around, or no people around, or the mutual relationship of the corresponding light emitting devices with no people around and those with people around. In the human-factor lamp in accordance with a preferred embodiment of this disclosure, each of the light emitting devices 1 has a control processor 10, and a dimming unit 11, an identification unit 12, a detection unit 13, a transmitting unit 14, a receiving unit 15 which are electrically connected to the control processor 10, wherein the identification unit 12 stores an identity code 120 and a relationship form 121, and the identity code 120 is used for the number identification of the light emitting device 1, and the relationship form 121 stores the identity codes 120 of all light emitting devices 1, and sets a hierarchical relationship between each of the light emitting devices 1 and the other light emitting devices 1. Wherein, the control processor 10, the identification unit 12 and the dimming unit 11 are a part of the "brain" which is specifically formed by electronic components such as a processor, an IC component, a logic circuit, a memory, etc. and the detection unit 13 has a function similar to the "eye" which is specifically implemented by using an infrared thermal sensor or a microwave sensor; the transmitting unit 14 has a function similar to the "mouth" which is specifically implemented by using a wireless technology such as the transmission function of a Bluetooth component used for implementing a single-stage or a continual multi-stage broadcast; the receiving unit 15 has a function similar to the "ear" which is specifically implemented by a wireless technology to provide the receiving function of the Bluetooth component. Therefore, each light emitting device 1 has the property of human factors in lighting and achieves the automatic lighting adjustment effect.

Figure 4:
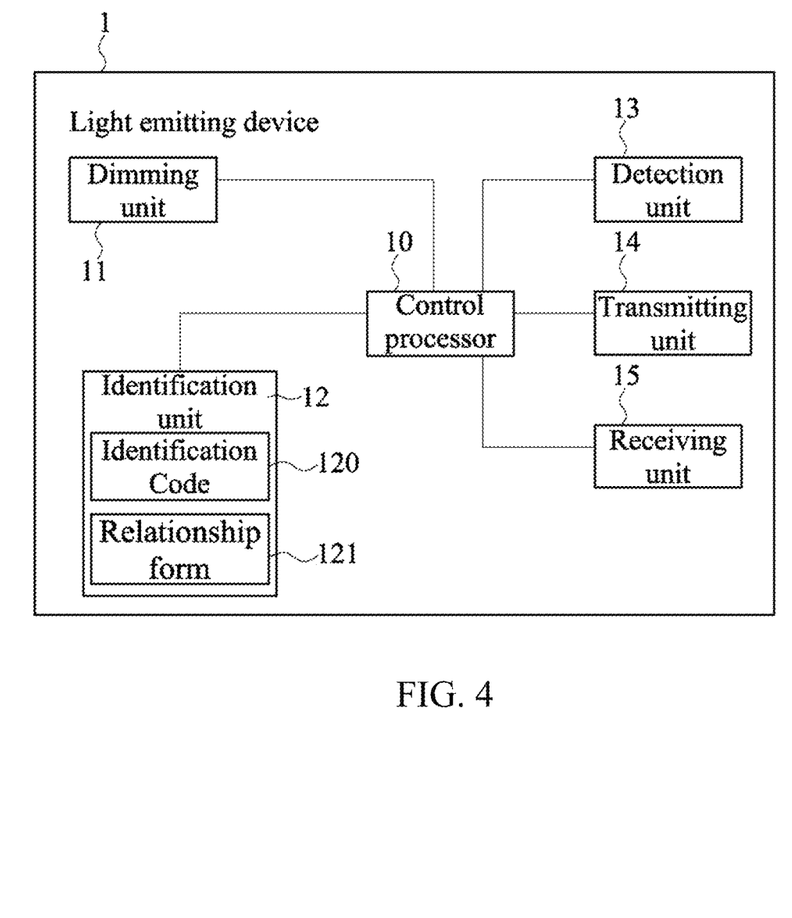
FIG. 4 is a functional block diagram of a human-factors lighting system in accordance with a preferred embodiment of this disclosure.
Figure 5:
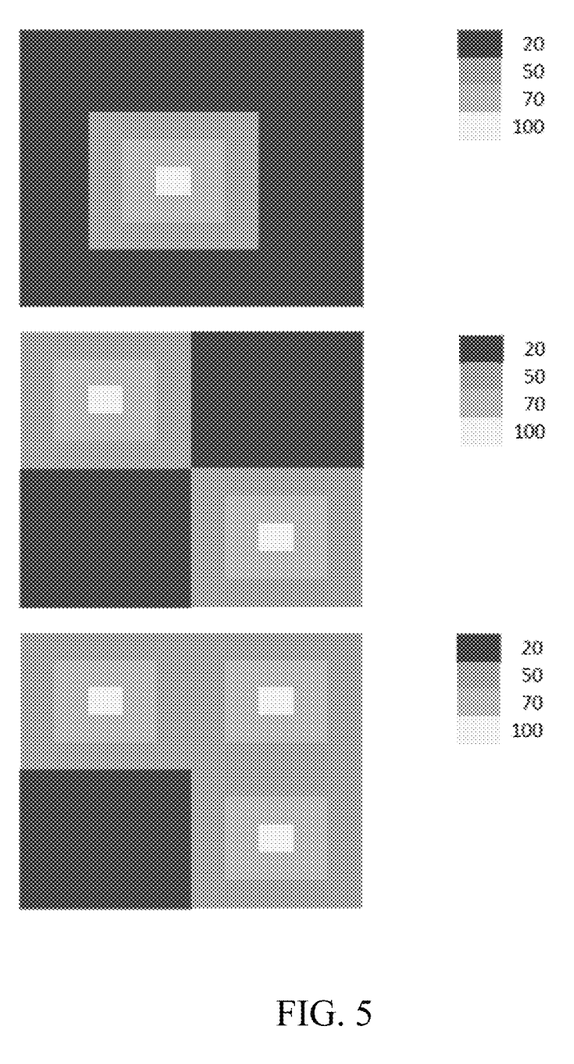
FIG. 5 is a first schematic view showing the overall operation of a human-factors lighting system in accordance with a preferred embodiment of this disclosure.
Figure 6:
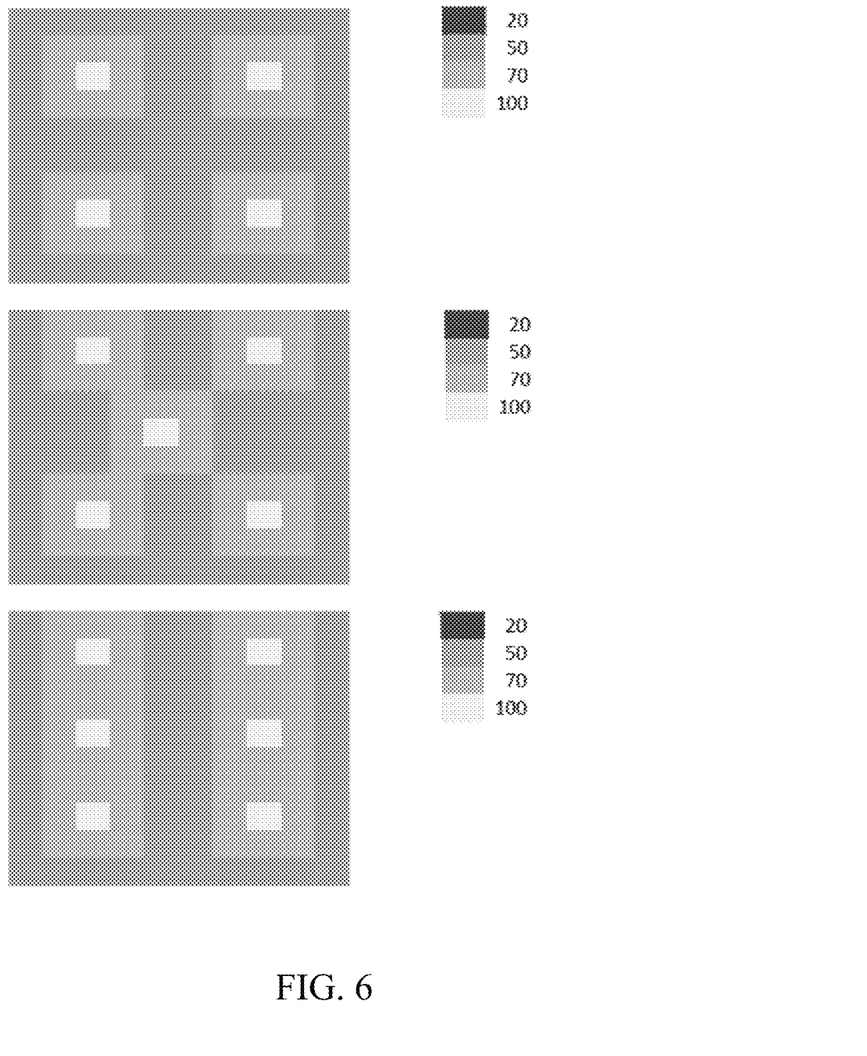
FIG. 6 is a second schematic view showing the overall operation of a human-factors lighting system in accordance with a preferred embodiment of this disclosure.
Figure 7:
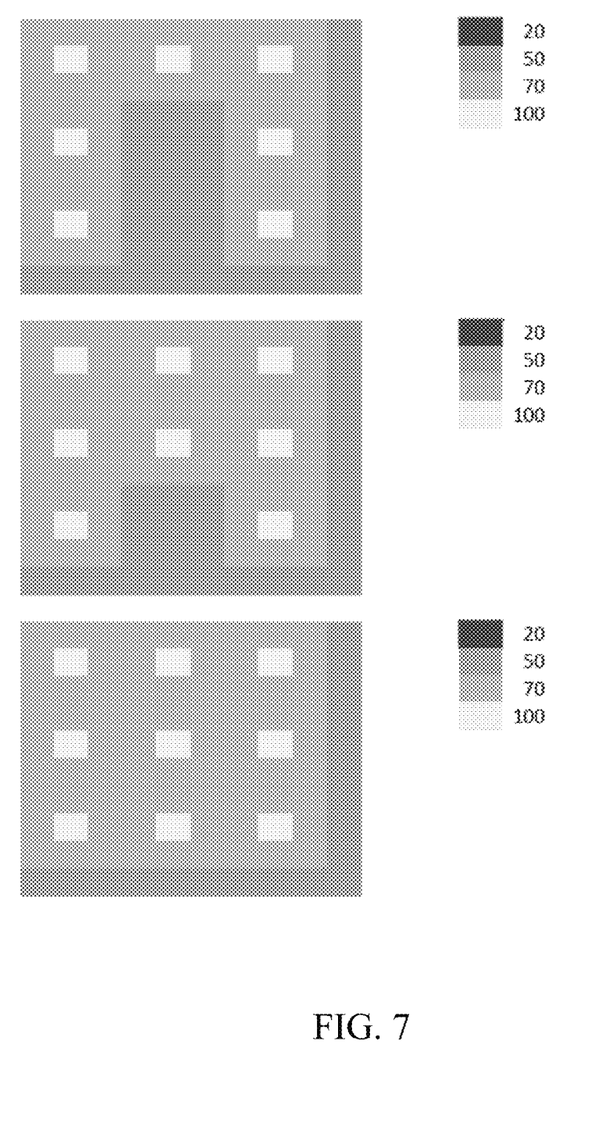
FIG. 7 is a third schematic view showing the overall operation of a human-factors lighting system in accordance with a preferred embodiment of this disclosure.
Figure 8:
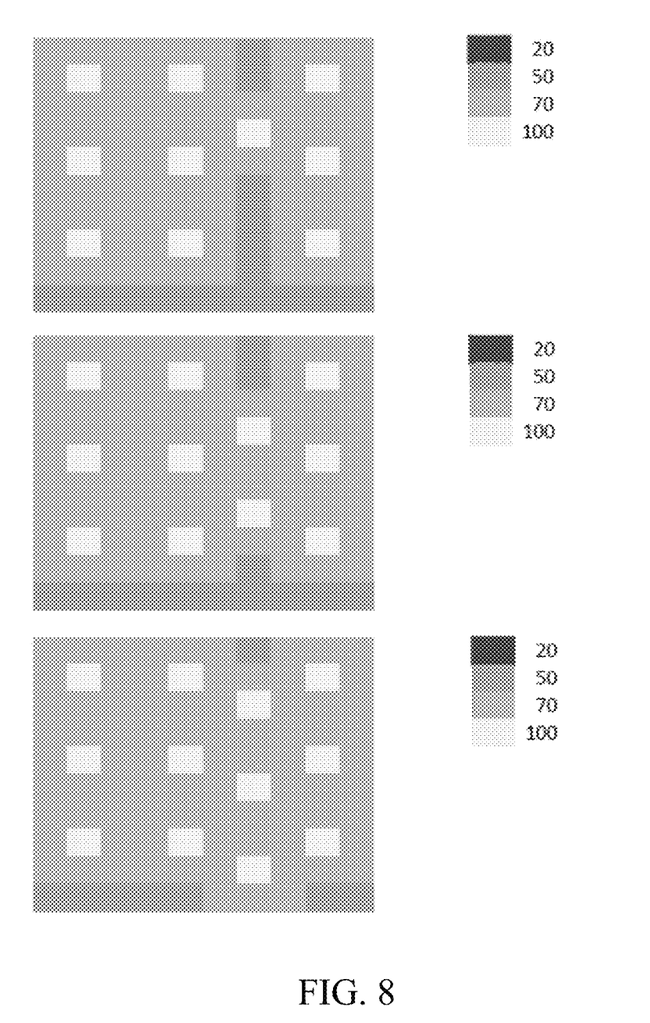
FIG. 8 is a fourth schematic view showing the overall operation of a human-factors lighting system in accordance with a preferred embodiment of this disclosure.
Figure 9:
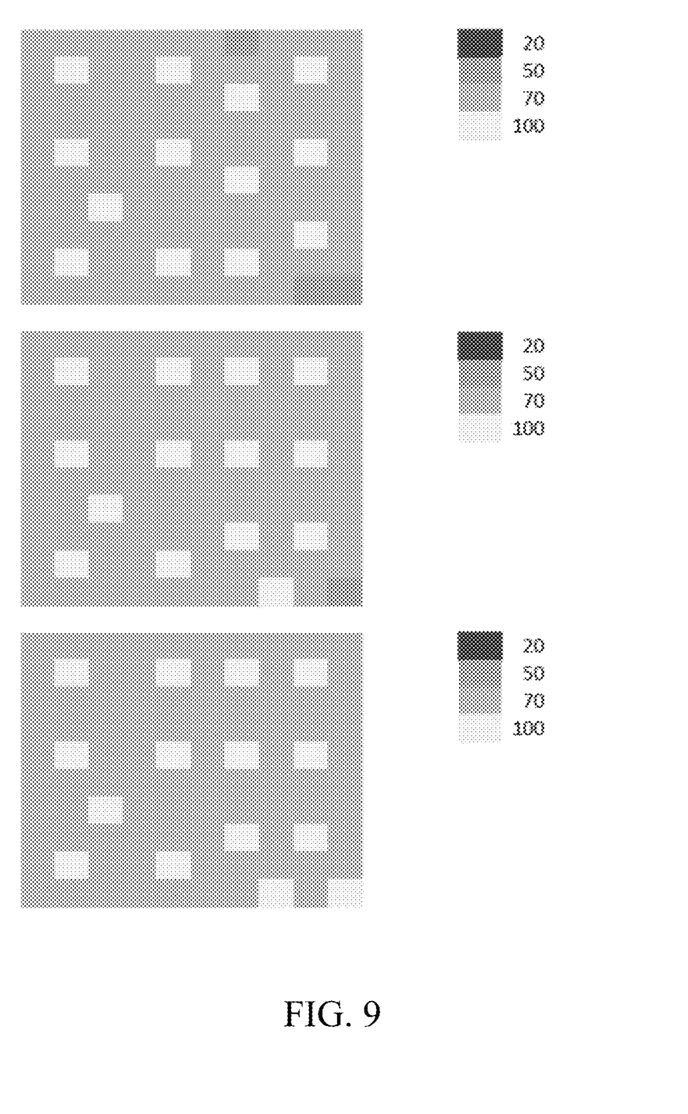
FIG. 9 is a fifth schematic view showing the overall operation of a human-factors lighting system in accordance with a preferred embodiment of this disclosure.

Further, when the detection unit 13 one of the light emitting devices 1 detects that there are people within the lamps sensor field of view (FOV), the detection unit 13 will notice the control processor 10 to drive the dimming unit 11 to set a priority luminous value, and the detection unit 13 will notice the control processor 10 to drive the transmitting unit 14 to perform a light emission broadcast to the light emitting devices 1 with the identity code 120 other than the identity code 120 of the light emitting devices 1 detected that there is a person within the lamps sensor field of view (FOV) listed in the relationship form 121. On the other hand, when the detection unit 13 of one of the light emitting device 1 detects that there are no people within the lamps sensor field of view (FOV), the receiving unit 15 will receive at least one the light emission broadcast from a light emitting devices 1 with the identity code 120 other than the identity code 120 of the light emitting device 1 detected that there is no people within the lamps sensor field of view (FOV), and the receiving unit 15 will notice the control processor 10 to drive the dimming unit 11 to set a secondary luminous value according to the light emission broadcast; wherein the secondary luminous value setting parameter is determined according to the hierarchical relationship of the relationship form 121, and if the receiving unit 15 simultaneously receives two or more light emission broadcasts, the secondary luminous value will set the most priority one as a secondary luminous value setting parameter according to the hierarchical relationship in the relationship form 121. In this way, each of the light emitting devices 1 determines whether there are people around to determine the setting of the priority luminous value; when the detection shows no people around, each light emitting device 1 observes other light emitting devices 1 to further determine the setting of the secondary luminous value. For example, the distance of two adjacent light emitting devices 1 is used as a basis for the hierarchical relationship, wherein the shorter the distance, the higher priority the mechanism. If a certain a light emitting device 1 detects that there are no people within the lamps sensor field of view (FOV), but there are people at a nearer light emitting device 1, then the light emitting device 1 with no people within the lamps sensor field of view (FOV) will set the secondary luminous value to A, and if there are people within the lamps sensor field of view (FOV) the farther light emitting device, then the light emitting device 1 without people within the lamps sensor field of view (FOV) will set the secondary luminous value to B. Since the light emitting device 1 can only be set to the secondary luminous value for the lighting in reality, therefore the second luminous value A of the nearer light emitting device 1 is used as the basis for setting the lighting. This technical measure does not have any central control system, and each light emitting device 1 observes the position of people and their moving situation, and then uses an interactive relationship between the light emitting devices to pre-set the automatic lighting adjustment conditions. Therefore, this disclosure can lower the overall setup cost, simplify the installation construction, and facilitates the adjustment of lighting, and the property of the human-factor lamp can meet the effective application requirement of an environment and save unnecessary energy consumption.

This embodiment does not adjust all light emitting devices by means of the central control, but uses the pre-set relationship between the light emitting devices to detect people as the priority trigger mechanism. If one of the light emitting devices does not detect that there are people around, then the pre-set relationship between such light emitting device and the light emitting device having people around is used to determine the lighting conditions of such light emitting device. This pre-set relationship exists in various indoor environments. Preferably, the hierarchical relationship of the relationship form 121 is set according to the installation distance. In this way, the overall distribution can be set according to the appropriate spacing distance based on the effective irradiation range of light. For example, the height of the ceiling and the size of the space in different environments have different distribution configurations. To facilitate listing all light emitting devices 1 in the relationship form 121, the identity code 120 corresponding to one of the light emitting devices 1 can use the X-Y two-dimensional coordinate value for the number identification. In this way, when the hierarchical relationship of the relationship form 121 is set according to the installation distance, the X-Y two-dimensional coordinate value can intuitively reflects the distance relationship between two adjacent light emitting devices 1.

Based on user requirements and site conditions such as the quantity and size of equipment, the wall reflection conditions, and related factors, an appropriate adjustment can be made according to the following suggestions if the adjustment has a tendency of decreasing the brightness with increased distance. For example, the brightness of the light emitting device can be decremented sequentially from the strongest 100% by equal intensity difference or reduced proportion. Further, a lamp having the light emitting devices with the intensity ratio of 100%; 70%; 50%; 20%, and arranged with a 10*10 matrix is used as an example. With reference to FIGS. 5-9 for the schematic views showing the overall operation of various human-factor lamps in accordance with a preferred embodiment of this disclosure, the lighting setting parameters of all light emitting devices 1 can be preferably divided into a plurality of lighting conditions according to the installation distance relationship, wherein the hierarchical relationship of the relationship form 121 has a first close relationship, a second close relationship, and a third close relationship. Therefore, each light emitting device 1 installed in an environment in accordance with this embodiment can use four lighting mode to form the indoor ambient light at the site. Preferably, when at least one the light emitting device 1 is set to the priority luminous value, the lighting performance is driven by 100% of the rated luminous intensity of the light emitting device 1; when at least one other light emitting device 1 sets the secondary luminous value to a first close relationship, the lighting performance is driven by 70% or 75% of the rated luminous intensity of the light emitting device 1; when at least one other light emitting device 1 sets the secondary luminous value to a first close relationship a second close relationship, the lighting performance is driven by 50% of the rated luminous intensity of the light emitting device 1; when at least one other light emitting device 1 sets the secondary luminous value to a third close relationship, the lighting performance is driven by 20% or 25% of the rated luminous intensity of the light emitting device 1. From these operations, we can see that when there are people in the environment, the best lighting performance can be presented in the position of people, the discomfort and psychological pressure of the too-dark area will not be produced for the environment at a distance.

In summation of the description above, the human-factor lamp capable of intelligently adjusting ambient light and its system in accordance with this disclosure can significantly lower the setup cost and facilitate the installation, and the lighting does not cause visual conflict or discomfort to the human eye after light adjustment, especially for places where lighting must be maintained for 24 hours a day, and the lighting system can further achieve the energy-saving effect for the overall environment and eliminate psychological pressure or panic caused the visual perception of the too-dark areas.

What is claimed is:

1. A human-factor lamp capable of intelligently adjusting ambient light, which has a plurality of light emitting devices, the human-factor lamp characterized in that each of the light emitting devices comprises a control processor, and a dimming unit, an identification unit, a detection unit, a transmitting unit, a receiving unit which are electrically coupled to the control processor, wherein the identification unit stores an identity code and a relationship form, and the identity code serves a number identification of the light emitting device, and the relationship form stores all identity codes of the light emitting devices, and pre-sets a hierarchical relationship between each of the light emitting devices and the lighting emitting devices other than itself;

if the detection unit of one of the light emitting devices detects that there is a person within the lamps sensor field of view (FOV), the detection unit will notice the control processor to drive the dimming unit to carry out a priority luminous value setup, and the detection unit will notice the control processor to drive the transmitting unit to carry out a light emission broadcast to the light emitting devices with the identity code other than the identity code of the lighting emitting device detected that there is a person within the lamps sensor field of view (FOV) listed in the relationship form;

if the detection unit of one of the light emitting devices detects that there is no person within the lamps sensor field of view (FOV), the receiving unit will receive at least one of the light emission broadcasts of the light emitting devices with the identity code other than the identity code of the light emitting device detected that there is no person within the lamps sensor field of view (FOV), and the receiving unit will notice the control processor to drive the dimming unit to set a secondary luminous value according to the light emission broadcast; wherein the secondary luminous value sets a parameter according to a determination by the hierarchical relationship in the relationship form, and if the receiving unit simultaneously receives two or more light emission broadcasts, the secondary luminous value will set the parameter for the secondary luminous value according to the highest priority of the hierarchical relationship in the relationship form.

2. The human-factor lamp according to claim 1, wherein the identity code of each respective light emitting device uses an X-Y two-dimensional coordinate value as number identification.

3. The human-factor lamp according to claim 2, wherein the detection unit is an infrared thermal sensor or a microwave sensor.

4. The human-factor lamp according to claim 1, wherein the hierarchical relationship of the relationship form is set according to an installation distance.

5. The human-factor lamp according to claim 4, wherein the identity code of each respective light emitting device uses an X-Y two-dimensional coordinate value as number identification.

6. The human-factor lamp according to claim 5, wherein the detection unit is an infrared thermal sensor or a microwave sensor.

7. The human-factor lamp according to claim 4, wherein the hierarchical relationship of the relationship form includes a first close relationship, a second close relationship, and a third close relationship.

8. The human-factor lamp according to claim 5, wherein the identity code of each respective light emitting device uses an X-Y two-dimensional coordinate value as number identification.

9. The human-factor lamp according to claim 8, wherein the detection unit is an infrared thermal sensor or a microwave sensor.

10. The human-factor lamp according to claim 7, wherein when at least one the light emitting device is set by the priority luminous value, lighting is driven by 100% of rated luminous intensity of the light emitting device; when at least one of the other light emitting devices sets the secondary luminous value to the first close relationship, lighting is driven by 75% of rated luminous intensity of the light emitting device; when at least one of the other light emitting devices sets the secondary luminous value to the second close relationship, lighting is driven by 50% of rated luminous intensity of the light emitting device; and when at least one of the other light emitting devices sets the secondary luminous value to the third close relationship, lighting is driven by 25% of rated luminous intensity of the light emitting device.

11. The human-factor lamp according to claim 10, wherein the identity code of each respective light emitting device uses an X-Y two-dimensional coordinate value as number identification.

12. The human-factor lamp according to claim 11, wherein the detection unit is an infrared thermal sensor or a microwave sensor.

13. The human-factor lamp according to claim 7, wherein when at least one of the light emitting devices sets the priority luminous value, lighting is driven by 100% of rated luminous intensity of the light emitting device; when at least one of the other light emitting devices sets the secondary luminous value to the first close relationship, lighting is driven by 70% of rated luminous intensity of the light emitting device; when at least one of the other light emitting devices sets the secondary luminous value to the second close relationship, lighting is driven by 50% of rated luminous intensity of the light emitting device; and when at least one of the other light emitting devices sets the secondary luminous value to the third close relationship, lighting is driven by 20% of rated luminous intensity of the light emitting device.

14. The human-factor lamp according to claim 13, wherein the identity code of each respective light emitting device uses an X-Y two-dimensional coordinate value as number identification.

15. The human-factor lamp according to claim 14, wherein the detection unit is an infrared thermal sensor or a microwave sensor.

\* \* \* \* \*